United States Patent Office 3,438,770
Patented Apr. 15, 1969

3,438,770
BRAZING ALLOY OF IMPROVED WORKABILITY CONTAINING NICKEL AND PALLADIUM
Charles Alfred Clark, Birmingham, and Roy David Berry, High Wycombe, England, assignors to The International Nickel Company, Inc., New York, N.Y., a corporation of Delaware
No Drawing. Filed Oct. 18, 1966, Ser. No. 587,427
Claims priority, application Great Britain, Oct. 22, 1965, 44,841/65; May 26, 1966, 23,675/66
Int. Cl. C22c 19/00, 5/00, 1/02
U.S. Cl. 75—134  3 Claims

ABSTRACT OF THE DISCLOSURE

A palladium-nickel brazing alloy for joining ceramic to metal contains, in atomic percent, about 20-65% palladium, up to 7% titanium, and about 1.5-9% of at least one element selected from zirconium, niobium, hafnium and lanthanum.

---

The present invention is directed to a special palladium-base brazing alloy particularly useful for the production of brazed joints between ceramic articles and between ceramic articles and metal articles and to the process for producing such brazed joints.

In U.S. Patent No. 3,277,150 a brazing alloy containing in weight percent about 30% to about 75% palladium and about 2% to about 9% titanium, with the remainder (except for impurities) being nickel has been described. This alloy is suitable for the production of brazed joints between ceramic materials and between ceramic materials and metals. The alloy is workable and can be drawn to wire or rolled into strip as long as the titanium content thereof does not exceed about 4% or about 5%, by weight. However, further experience with the alloy has demonstrated that the workability thereof could be improved further and that an improvement in workability would enable the yield of useful material from the ingot stage to wrought form to be increased. It appears that the working difficulties which have been encountered with the aforementioned materials have been due to oxidation during the melting operation with the result that undesirable inclusions have been found at the grain boundaries. It has been difficult in working up the alloys as described in the aforementioned U.S. patent to obtain a yield of useful material exceeding about 40% by weight of the ingot.

It has now been found that by proper compositional control involving the use of certain additional alloying ingredients, the workability of palladium-nickel base brazing alloys can be substantially increased while retaining the desirable properties of the alloys in respect of the production of brazed joints between ceramic materials and between ceramic and metal materials.

It is an object of the present invention to provide a palladium-nickel brazing alloy having improved workability.

It is another object of the invention to provide an improved palladium-nickel brazing alloy suitable for the production of brazed joints in assemblies comprising ceramic materials.

Other objects and advantages of the invention will become apparent from the following description.

Broadly stated, the present invention comprises brazing alloys containing in atomic percent from about 20% to about 65% palladium, from about 1.5% to 9% in total of at least one element from the group consisting of zirconium, niobium, hafnium and lanthanum, up to about 7% titanium, with the remainder (except for impurities) being nickel, that is to say, the nickel content may be from 19 to 78.5 atomic percent. When the alloys contain titanium with zirconium, niobium, hafnium and lanthanum or any combination of these elements, the total content of these elements does not exceed 9 atomic percent.

Impurities that may be present include cobalt, iron and copper, each up to 1.5 atomic percent and carbon up to 5 atomic percent. Particularly deleterious impurities include boron and lithium, which contribute to the attack and breakdown of ceramic articles which are brazed with the alloys and which should be avoided accordingly.

It is to be understood that in accordance with the invention, titanium may be altogether absent from the alloys or may be copresent with zirconium or niobium or hafnium or lanthanum or with a combination of the latter-named elements. It is found that palladium-nickel alloys containing at least one element from the group consisting of zirconium, niobium, hafnium and lanthanum are more readily produced in a workable form and offer the same advantages as brazing materials as do ternary alloys of palladium, nickel and titanium.

It is found that the addition of zirconium to the alloys gave the best adhesion of ceramic to metal in a ceramic-metal joint, that the addition of hafnium gave the best chemical attack of the ceramic to produce a bond, that lanthanum produced a good compromise between adhesion and attack of ceramic, and that niobium is particularly effective in improving the workability of the alloys. The relative proportions of titanium, zirconium, hafnium, niobium and lanthanum can be varied to suit the particular type of joint and materials to be joined.

Examples of some alloys according to the invention together with their melting points are given in the table below:

| Alloy No. | Pd, percent[1] | Ni, percent | Zr, percent | Nb, percent | Ti, percent | Hf, percent | La, percent | Melting point, °C. | Percent yield |
|---|---|---|---|---|---|---|---|---|---|
| 1 | 44 | 52 | 4 | | | | | 1,225 | 60 |
| 2 | 40 | 54 | 6 | | | | | 1,200 | 55 |
| 3 | 41.3 | 56 | | 2.7 | | | | 1,230 | 90 |
| 4 | 36.5 | 58.2 | | | 5.3 | | | 1,226 | 80 |
| 5 | 40.5 | 54.5 | 1.7 | | 3.3 | | | 1,225 | 50 |
| 6 | 38.3 | 53 | | | 6.5 | 2.2 | | 1,220 | 50 |
| 7 | 44 | 54 | | | | | 2 | 1,210 | 75 |
| 8 | 41 | 55 | | | | | 4 | 1,190 | 70 |
| 9 | 43 | 50 | | | | | 7 | 1,190 | 65 |
| 10 | 45 | 52 | | | | 3 | | 1,200 | 80 |
| 11 | 40 | 58 | | | 1 | 1 | | 1,205 | 80 |
| 12 | 42 | 53 | 4 | | 1 | | | 1,210 | 70 |
| 13 | 41 | 51 | 2.5 | 3 | 1.5 | 0.5 | 0.5 | 1,230 | 60 |

[1] Atomic percent.

It is to be appreciated that alloys with higher melting points for use in ceramic-to-ceramic joints which may require them can readily be obtained by adjustment of the palladium or nickel contents of any one of the alloys shown in the table.

The alloys are preferably prepared by arc-melting using a tungsten electrode in a furnace with a copper hearth under a titanium-gettered argon atmosphere. The alloys are then hot forged at 1000° C. to 1100° C. and hot rolled at 1000° C. to 1100° C. to 0.03 inch followed by cold rolling to the desired size. Ingots for the production of wire should be produced in a similar manner and, after hot forging and hot swaging at 1000° C. to 1100° C., should be hot drawn to wire at 800° C. to 100° C. at 0.05 inch followed by cold drawing. Before use, the alloys should preferably be vacuum annealed.

The invention enables ingots of up to at least 10 ounces to be worked with improved yields of useful material. For example, Alloy 1 in the table gave a yield of 60% and Alloys 8 and 10, gave a yield of 70% and 80%, respectively.

Metals which have to be brazed to ceramic materials commonly consist of alloys which by reason of the presence of chromium, aluminum, titanium or other elements tend to form coherent and tenacious oxide films on their surfaces. Examples are alloys that have a base of nickel, nickel and iron, nickel and cobalt or nickel, iron and cobalt, and the austenitic chromium steels. In the production of joints between such metals and ceramic materials according to the invention, the brazing operation may be carried out in hydrogen, in vacuo or in argon and then the brazing alloy reacts with the surface of the ceramic material and with the oxide film on the metal so that a satisfactory joint is formed.

Ceramic materials that may be brazed to themselves, to other ceramic materials or to metal according to the invention include insulating materials essentially composed of metallic oxides such as alumina, magnesia, thoria and zirconia or of aluminosilicic acid or of zirconium silicate or certain nitrides such as silicon nitride, all of which may contain more or less foreign matter such as ferric oxide, silica and calcium carbonate. The ceramics which are brazed in accordance with the invention are dense, essentially crystalline materials having superior low-loss properties at high frequencies and high temperatures, e.g., up to 1100° C. These materials also have high mechanical strength and high shock resistance as compared to glass and serve as nonconductors as well as structural members in hermetically sealed, vacuum-tight, ceramic and metal-ceramic electrical and electronic assemblies. Such assemblies include ceramic "windows" and envelopes for electron tubes, feed-through insulators for hermetically-sealed transformers, capacitors, klystrons, triodes and tetrodes for radar and other high frequency uses, etc.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:
1. A brazing alloy consisting of, in atomic percent, about 20% to about 65% palladium, about 1.5% to about 9% of at least one element from the group consisting of zirconium, niobium, hafnium and lanthanum, up to about 7% titanium, and with the balance except for impurities being nickel.

2. A brazing alloy according to claim 1 containing, in atomic percent, about 36.5% to 45% palladium, up to about 6% zirconium, up to about 5.3% niobium, up to about 6.5% titanium, up to about 3% hafnium, up to about 7% lanthanum, with the total content of zirconium, niobium, hafnium and lanthanum being at least about 1.7% up to about 7%, and the balance essentially nickel, with the nickel content being about 50% to about 58.2%.

3. A brazing alloy consisting of, in atomic percent, about 40% palladium, about 6% zirconium, and with the balance except for impurities being nickel.

References Cited

UNITED STATES PATENTS

| | | |
|---|---|---|
| 2,159,809 | 5/1939 | Lenz et al. |
| 2,226,079 | 12/1940 | Spanner. |
| 2,815,282 | 12/1957 | Rhodes et al. |
| 3,070,875 | 1/1963 | Feduska. |
| 3,190,749 | 6/1965 | Fleming _____ 75—134 X |
| 3,277,150 | 10/1966 | Rhys et al. _____ 75—134 X |

FOREIGN PATENTS

| | | |
|---|---|---|
| 254,666 | 7/1926 | Great Britain. |

OTHER REFERENCES

Rhys et al., "The Development of Palladium Brazing Alloys," Metallurgia, December 1962, pages 255–263.

L. DEWAYNE RUTLEDGE, *Primary Examiner.*

P. GLICKERT, *Assistant Examiner.*

U.S. Cl. X.R.

75—170, 172